United States Patent [19]

Aisenberg et al.

[11] 3,931,589

[45] Jan. 6, 1976

[54] PERFORATED WALL HOLLOW-CATHODE ION LASER

[75] Inventors: Sol Aisenberg, Natick; Kuowei Chang, Lexington, both of Mass.

[73] Assignee: The United States of America as represented by the Secretary of the Navy, Washington, D.C.

[22] Filed: Mar. 21, 1974

[21] Appl. No.: 453,237

[52] U.S. Cl..... 331/94.5 PE; 331/94.5 D; 315/5.38; 330/4.3
[51] Int. Cl.². .......................... H01S 3/22; H01S 3/03
[58] Field of Search.................. 331/94.5; 315/5.38; 330/4.3

[56] References Cited
UNITED STATES PATENTS
3,586,996  6/1971  Milochevitch et al. ........ 331/94.5 G Primary Examiner—Robert J. Webster
Attorney, Agent, or Firm—R. S. Sciascia; P. Schneider; W. T. Ellis

[57] ABSTRACT

An improved ion-laser system utilizing a cold, perforated-wall hollow-cathode electron-beam discharge to produce a high energy, high intensity self-collimated electron-beam to provide a high efficiency, high power continuous wave or pulsed ion-laser oscillations in both visible and ultra-violet ranges.

24 Claims, 10 Drawing Figures

(a) $f_e$ AND $\sigma_i$ FOR CONVENTIONAL GAS DISCHARGE (b) $\sigma_i f_e$ FOR CONVENTIONAL DISCHARGE (c) $f_e$ AND $\sigma_i$ FOR HOLLOW CATHODE DISCHARGE (d) $\sigma_i f_e$ FOR HOLLOW CATHODE DISCHARGE

PERFORATED WALL HOLLOW-CATHODE ION LASER

BACKGROUND OF THE INVENTION

1. Field of Invention

The present invention relates to laser devices, and more particularly to ion-laser devices employing hollow cathode electrode structures.

For ion-lasers, the pertinent transitions of energy states necessary for laser action are associated with the excited states of singly or multiply ionized gas. To cause these excited states it is necessary that the density of charged particles (i.e., ions) present in the laser as well as the degree of their ionization (and hence the current density) be very high.

To achieve laser action with relatively modest currents, conventional ion-lasers generally use either a water-cooled quartz capillary, a refractory material capillary, a graphite annulus, or segmented metal rings to both constrict the discharge current and to provide the requisite high degree of ionization and excitation rate. Conventional lasers constructed in this manner suffer from serious deficiencies that make them inefficient, relatively shortlived, and unreliable.

The high input power density that is used creates a severe thermal dissipation problem which ultimately limits the maximum attainable optical output power of the device. For example, the interface between the quartz capillary and the cooling medium is of very small area; since quartz is a notoriously poor conductor of heat, a limitation is placed on the power dissipation that can be tolerated per unit length of capillary. An even more serious problem is physical change of the quartz itself — such as erosion, sputtering, strains, and eventual destruction of the capillary walls caused by contact with the high temperature plasma and by ion bombardment in a high current density discharge. In the pressure range in which the capillary tubes are operated, the ion mean-free-path is comparable to the bore of the discharge tube. As a result, an ion can be accelerated into the capillary wall with a kinetic energy of several electron volts. Collision of these high energy ions with the walls causes the quartz to gradually decompose and darken, thereby imposing a serious limitation on the useful life of ion lasers. Gas cleanup and cathophoresis are also related serious problems.

More importantly, since the surface-to-volume ratio of the discharge column is extremely large, and since in these prior art devices the plasma is in physical contact with the wall, a high rate of both energy dissipation and ion depletion (through surface recombination) will result, thereby reducing considerably the overall efficiency of existing ion lasers.

As is well known for continuous wave ion lasers, both gain and beam power output increase rapidly with increasing discharge current density. But since the current density J of conventional ionlasers must be limited to relatively low levels because of the limited thermal dissipation capacity of the quartz capillary, these lasers are operated under conditions which do not result in favorable output efficiencies. For example, in a 4880A argon ion-laser, the output power varies exponentially with current density J as $J^6$ at low current densities falling off to $J^4$ at high current densities (on the order of 100 amp/cm$^2$). At still higher current densities, both the gain and the output power display a $J^2$ dependence. This indicates that the production of radiating ionic states, such as the laser levels, proceeds by electron excitation of ions to the optical state from the ion ground state or from the ion metastable state, or both. Therefore the density of excited ions in the upper laser state increases quadratically with electron density and thus with discharge current density.

Trapping of resonance radiation from the lower laser level to the ion ground state (reabsorption of radiation by ground state ions to bring the ion back to an excited lower level of the lasering transition which occurs at extremely high current density (on the order of $10^3$ amp/cm$^2$) can destroy the population inversion necessary for laser operation and thus reduce the output power to zero.

Operation at the current density corresponding to peak gain and peak output power is not possible for prior CW ion lasers because of the serious above-described material problems associated with thermal dissipation and ion bombardment.

Other problems which arise from the requirement for the necessary plasma include maintenance of ionization of the gas and the related problem of the choice of a suitable E/p ratio for the particular laser gas. In addition, because of the high power per unit volume normally associated with high power lasers, removal of heat through walls of the discharge tube is another related problem of prior art devices. Further, in some prior art devices it is necessary to cool the laser gas itself. Also, the requirement for a high density of electrons (and for particular values of E/p) usually results in occurrence of large plasma currents which strain the electrodes.

In molecular gas lasers there is a tendency for the plasma to become unstable, particularly at higher pressures. In this event the plasma will constrict and form filaments which concentrate on limited portions of the cathode. The unstable plasma will not uniformly fill the laser area; in many cases it will reduce the output of the laser.

Another object of the instant invention is to contain a plasma region in a gas laser so that the plasma is not in contact with containing walls.

Yet another object of the present invention is to maintain an abnormal glow discharge within a hollow cathode structure by use of a coaxially-mounted auxiliary anode surrounding the cathode.

BRIEF DESCRIPTION OF THE DRAWINGS

FIG. 5b is a graphical representation of the electric field along the beam axis of the embodiment of FIG. 5a.

DETAILED DESCRIPTION

Figure 1:
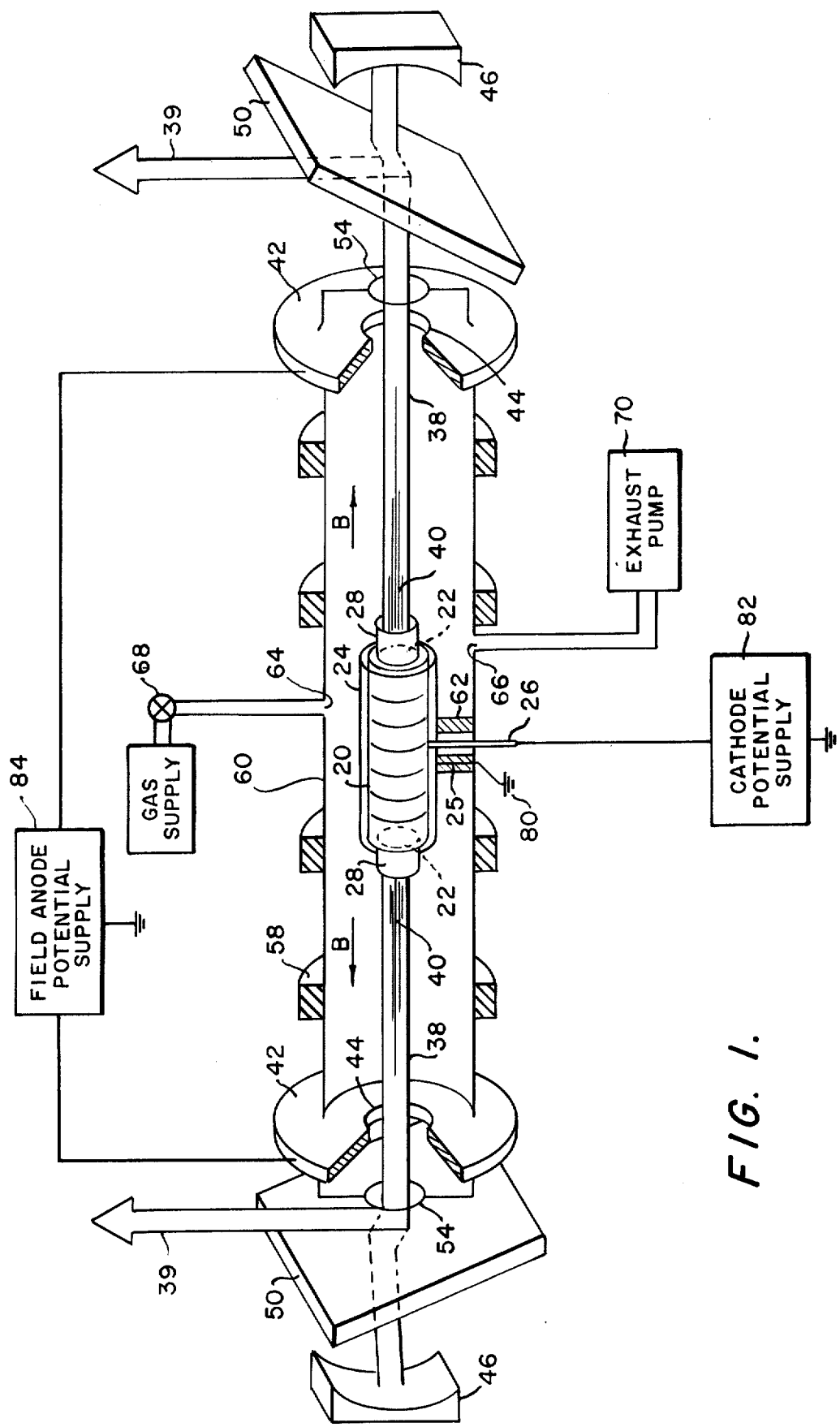
FIG. 1 shows in pictorial cross section a gas laser in accordance with the present invention.

In general, the primary goal in laser operation is efficient excitation of optical states. In the case of ion and gas lasers this excitation is accomplished primarily by energy derived from electrons. In order to achieve a high-output optical power-per-unit-volume as well as a high inverted-state population necessary for gain, a high density of electrons is required. Associated with the high density of electrons is a negative space charge forming a self-electric field which can significantly inhibit introduction of additional electrons unless an extremely high energy electron beam is utilized. Thus, associated with the presence of a high density of electrons is a requirement for neutralization of the negative space-charge. The neutralization is accomplished by utilization of positive ions. This combination of electrons and ions with approximate charge equality constitutes a plasma.

In a laser plasma, the essential component (besides the gas) is a high density of energetic electrons (on the order of 1 to 10 e.v) to provide necessary energy for excitation of the optical states. In general the presence of positive ions is a by-product (the mere presence of high energy electrons in a gas will produce ions through the usual plasma ionization process) — except in ion laser devices where it is more desirable to excite positive ions to the optical state than to excite the ground state of neutral gas atoms. Thus in ion laser devices, the presence of ions is necessary to its fundamental operation and not merely for negative space-charge neutralization; these ions are produced by means of high energy electrons in the plasma. For the most efficient operation of gas lasers, a source of a high density of electrons with optimum valves of electron energy is necessary. Electrons having high energy levels are very useful for ion lasers, while electrons of lower energy are most useful for molecular gas lasers.

One way of producing a plasma is to apply an electric field across a gas at a value sufficient to produce ionization of the gas. At least three factors are important to creation and sustaining of plasma usable in gas lasers: First, the applied electric field must be of sufficient value relative to the gas pressure and composition to produce enough ionization to maintain a plasma. Secondly, the electric field must be tailored to maintain a stable plasma, since plasmas in general are unstable. Thirdly, the electric field must be adjusted to maintain a plasma which has appropriate operating parameters (e.g. E/p) to efficiently excite the optical states necessary for the laser action. These three constraints in general cannot be optimally satisfied by the same electric field and set of operating parameters.

The present invention treats separately the production of the plasma and the optimization of the plasma for laser action. Production of an efficient plasma maintainable over a wide range of operating conditions is accomplished by the hollow cathode electrode of the present invention. Since the plasma is then relatively independently produced and maintained over a wide variation of laser operating conditions, particular optimum conditions for lasing conditions relatively independent) can be very important in providing a high-power, high-efficiency gas laser.

The presence in the laser enclosure of a lasing gas at a pressure p, and the presence of an electric field E for accelerating electrons (i.e., increasing the energy of the electrons) implies a ratio of electric field to pressure, (E/p). This ratio is an important descriptive parameter for the laser plasma, and has an optimum value for each gas and for each particular excitation state.

The pressure has an effect on the average mean distance between ions; it thus is indicative of the distance an electron will travel (and therefore its energy gained by acceleration) before it collides with an ion. The E/p value is also important to maintenance of the plasma by ionization of the gas.

It is important to note that for prior ion-laser devices the same E/p value usually is not an optimal value for both excitation and ionization, and therefore a compromise value must be utilized. The present invention avoids this compromise.

By introduction of electrons into the plasma in accordance with the present invention, optimum E/p conditions for optical excitation may be utilized while at the same time maintaining the plasma by means of external electrodes. The freedom to choose optimum E/p conditions for optical excitation as afforded by the present invention is a highly important improvement respecting ion lasers.

Also, characteristics of the laser relating to excitation of optical states require excitation by electrons having a particular energy for a particular gas and excitation state.

Since the active discharge column is contained in a kind of "electrostatic tubing", it is therefore physically removed from any solid boundary. Thus the energy loss to the wall is reduced giving a higher efficiency. The damage to the wall is also reduced. It is known that for perforated wall hollow cathode discharges, 75% to 95% of the input power resides in the electron beam. Because, in the present invention the electron beam is electrostatically confined and is not in physical contact with any surface, there is very little loss to the walls of the discharge tube. A large portion of the beam power is dissipated by excitation and ionization collisions, and the remaining power is delivered to the hollow anode which can be conveniently cooled. This anode power loss can be reduced to a minimum by a scheme involving a depressed anode bias technique sometimes used in microwave operations. In the "depressed anode" technique, an accelerating anode is used to accelerate the electrons. Once the electrons are accelerated, there is no need to collect them on the accelerating anode. These electrons are collected on another anode operated at a depressed (or lower) voltage so that less power is taken from the power supply for completing the electron flow circuit.

By use of the present invention, all of aforesaid disadvantageous aspects of prior gas laser devices can be significantly reduced if not completely eliminated.

One embodiment of the present invention is shown in FIG. 1. A cold cathode structure 20 in the form of a perforated hollow cylinder is supported within an elongated laser enclosure 60 by conductive rod 26 so that the axis of the cylinder is generally coincident with the axis of the elongated portion of the laser enclosure. Conductive rod 26 is surrounded by insulator 62 which also serves as a support and as a passageway for conductive support rod 26 to pass through the wall of laser enclosure 60. Conductive rod 26 is connected to a source of negative operating potential 82. The cathode is constructed of a perforated material such as a mesh wire screening of Cu, Mo, Al or stainless steel having a transparency on the order of 80%–90% except for an aperture 22 in each of two end plates through which an electron beam 40 may pass. Attached to the exterior of the cathode element 20 are two focusing tubes 28 which surround the apertures 22. The cathode 20 is approximately 3 inches long and has a diameter of approximately 1 inch; the apertures 22 are generally circular with an approximate diameter of ⅛ inch; the focusing tubes are approximately ½ inch long and have a diameter of ¼ inch.

Surrounding the cathode 20 is a conductive metal shield or auxiliary anode 24, constructed of any suitable material such as stainless steel, etc. The shield or auxiliary anode 24 completely surrounds the cathode 20 and is kept at a uniform distance (e.g. 1/32 inch) from the cathode except that openings are provided to allow the focusing tubes 28 and conductive support rod 26 to pass. Insulator 62 also serves to support shield or auxiliary anode 24 and to provide a passageway for conductor 25 to connect the shield auxiliary anode 24 to a source of operating potential 80 such as ground.

Attached to each end of elongated laser enclosure 60 is a field anode 42 having an aperture 44 in its center to allow a laser beam 38 to pass. Each field anode 42 is connected to a source of positive operating potential 84. Thus, the field anode 42 is generally at a positive voltage potential with respect to the shield or auxiliary anode 24 which is at a positive potential with respect to cathode 20.

As an optional feature electric coils 58 are placed around the elongated portion of laser enclosure 60, connected to a source of operating current (not shown), and arranged to produce a magnetic field B. Permanent magnets can also be used to provide an axial magnetic field, which may or may not have an alternating magnetic polarity (N-S, S-N, N-S, S-N, etc.).

The laser enclosure 60 is constructed from any suitable material such as glass or quartz, and forms a complete enclosed chamber. A suitable, relatively inert gas such as $H_2$, He, $N_2$, Ar, Ne, $CO_2$, air, etc. is allowed to enter the laser enclosure 60 through input port 64 at a rate determined by regulator 68 from supply 69. A pump 70 exhausts the gas through outlet port 66 and, in combination with regulator 68 maintains a predetermined desired constant pressure on the order of one to one thousand microns Hg.

On the end of enclosure 60 outside of each hollow field anode 42 is a Brewster angle window 54 which form the ends of the laser enclosure and allows laser beam 38 to pass out of the tube. Along the optic axis of laser beam 38 and outside laser enclosure 60 are located beam splitting mirrors 50 and concave feedback laser mirrors 46.

Operation of the present invention will now be described. On application of an high negative D.C. potential from cathode potential supply 82 through conducting rod 26 to the cathode 29, wellcollimated electron beams 40 are formed. Electron beams 40 emanate from the two apertures 22 of the hollow cathode 20 and terminate at the two hollow accelerating or field anodes 42 located at both ends of the laser discharge tube 60. Current density of the electron beams 40 can be further augmented by the longitudinal magnetic field B generated by the external field windings 58. This magnetic field is provided by electric coils 58 arranged and operated so as to produce a magnetic field B directed axially from the center of the laser enclosure toward each accelerating or field anode 42.

Positive ions are formed in the path of electron beam 40 by collisions of high energy electrons with gas atoms. The high energy electrons within the beam further excite the ions to various levels to produce laser oscillations, and the resulting optical output is obtained either from one of the two confocal mirrors 46 which may be transmissive (e.g. 90%), thus allowing a portion of the beam to pass or from beam splitter 50, coated with a reflective coating allowing a portion 39 of the beam 39 to be reflected.

When the cathode of a hollow cathode structure having apertures is subjected to a high negative potential with respect to an anode and with proper cathode geometry and pressure level in the hollow chamber, a well defined pencil beam of high current density, high energy electrons emanates from the apertures.

The hollow cathode has a cathode fall region adjacent to its external surface. The electrons for the beam are obtained, however, from a plasma generated by an intense discharge within the chamber enclosed by the cathode. If the aperture through which the electron beam 40 emerges is then so shaped to where at least one cross-sectional dimension is less than the size of the cathode fall region, an electrostatic focusing effect on the electrons is obtained and a well-defined electron beam is produced.

The laser enclosure 60 is evacuated and then filled with a suitable gas such as helium to a suitable pressure (e.g. $5 \times 10^{-2}$ Torr.). A glow discharge is started by bringing the cathode assembly 20 to a sufficiently negative potential (e.g. 2.5 kilovolts). Initially, outgassing of the cathode assembly 20 and heating of the gas occurs, but if the pressure is reduced by further restricting the flow of the gas into the enclosure 60, then at a critical pressure (e.g. $4 \times 10^{-2}$ Torr.), the glow discharge changes to a hollow cathode discharge accompanied by beam of electrons 40 which pass through apertures 22. The energy of the beam is increased by making the potential of the cathode assembly 20 more negative.

The cold, hollow cathode is of central importance to the improved ion laser of the present invention. This cathode produces a discharge generally characterized by three discharge regions: The interior region inside the hollow cathode 20 contains a plasma which serves as the source region for the electron beam 40. The exterior region outside of and surrounding the anode structure 24 maintains an abnormal glow discharge which accelerates and shapes the electron beam 40, and supplies some ballistic ions through the perforated wall to sustain the interior discharge. The region in the vicinity of cathode aperture 22 forms the third discharge region. Electrons escaping through the beam aperture 22 are accelerated into the plasma positive column in essentially a rectilinear flow. This last discharge region also supplies energetic ions to sustain the (hollow) (negative glow) discharge. Hence, the apertures 22 serve as sources of ions for the hollow discharge and electrons for the abnormal glow discharge.

The plasma inside the cathode may be considered as a virtual cathode populated by electrons and ions. This plasma is highly ionized and is sustained by ionization of the gas caused by electrons originating at the interior cathode surface and energetic ions entering through the perforated cathode wall and the apertures. Ions diffusing to the plasma boundary are accelerated across the internal sheath and continuously bombard the cathode surface with energies of a few hundred volts. As a result, an electron current emanates from the inside of the cathode walls due to secondary emission. Because of the low quantum yield of the cathode material, photo-emission accounts for about 5% of the total emission current.

After penetrating the internal cathode sheath, the emitted electrons have a kinetic energy corresponding to the sheath potential drop. These fast electrons may simply traverse the plasma and strike the opposite cathode surface, where they recombine with ions--unless some elastic or inelastic collision occurs in transit. If such an interaction takes place, the electron loses some of its energy, with the result that it is trapped within the plasma. The trapped electron then loses more energy by inelastic collisions with the gas. The probability that an electron emitted at the cathode surface will be trapped in the plasma is determined by the cathode geometry and the mean-free-path of interaction within the hollow cathode. Since this trapping efficiency is high, the degree of ionization of the plasma is very high. A relatively high concentration of ions exists at the cathode aperture due to the influx of ions from the beam. The resulting space-charge field extracts electrons from the internal plasma by essentially lowering the height of the potential barrier that an electron experiences in the vicinity of the aperture. Thus, electrons with sufficient energy to surmount this reduced barrier will emerge from the aperture to form the beam.

The electron beam obtained from the perforated wall hollow cathode discharge remains quite well collimated as it traverses the positive column, even though there is a high current density. This electron beam is marked by the luminosity of excited atoms and ions in its path. With no auxiliary focusing, the beam cross-section is usually dictated by the size of the dominant cathode aperture; the beam cross section can be made smaller by adjustment of pressure and cathode bias. It should be noted that utilization of an Einzel lens construction along the laser axis of the laser tube can help control the electrostatic field and assist in making it independent of the wall boundaries. Also, an alternating gradient magnetic field along the axis of the plasma (electron) beam may be utilized alternatively to or in conjunction with the Einzel lens construction for the purpose mentioned above. This magnetic field can be provided by disk permanent magnets with alternating polarities such as North-South, South-North, North-South, etc.

This important property of self-focusing of the plasma electron beam is due to the combined action of positive-ion spacecharge both near the aperture and in the beam path, and the electrostatic lensing property of an aperture separating regions of differential potential gradients. The electron space charge, which is responsible for beam spreading and mutual repulsion of electrons in a conventional high vacuum beam, is completely neutralized by the ion space charge present in the gas laser of the present invention.

Figure 6:
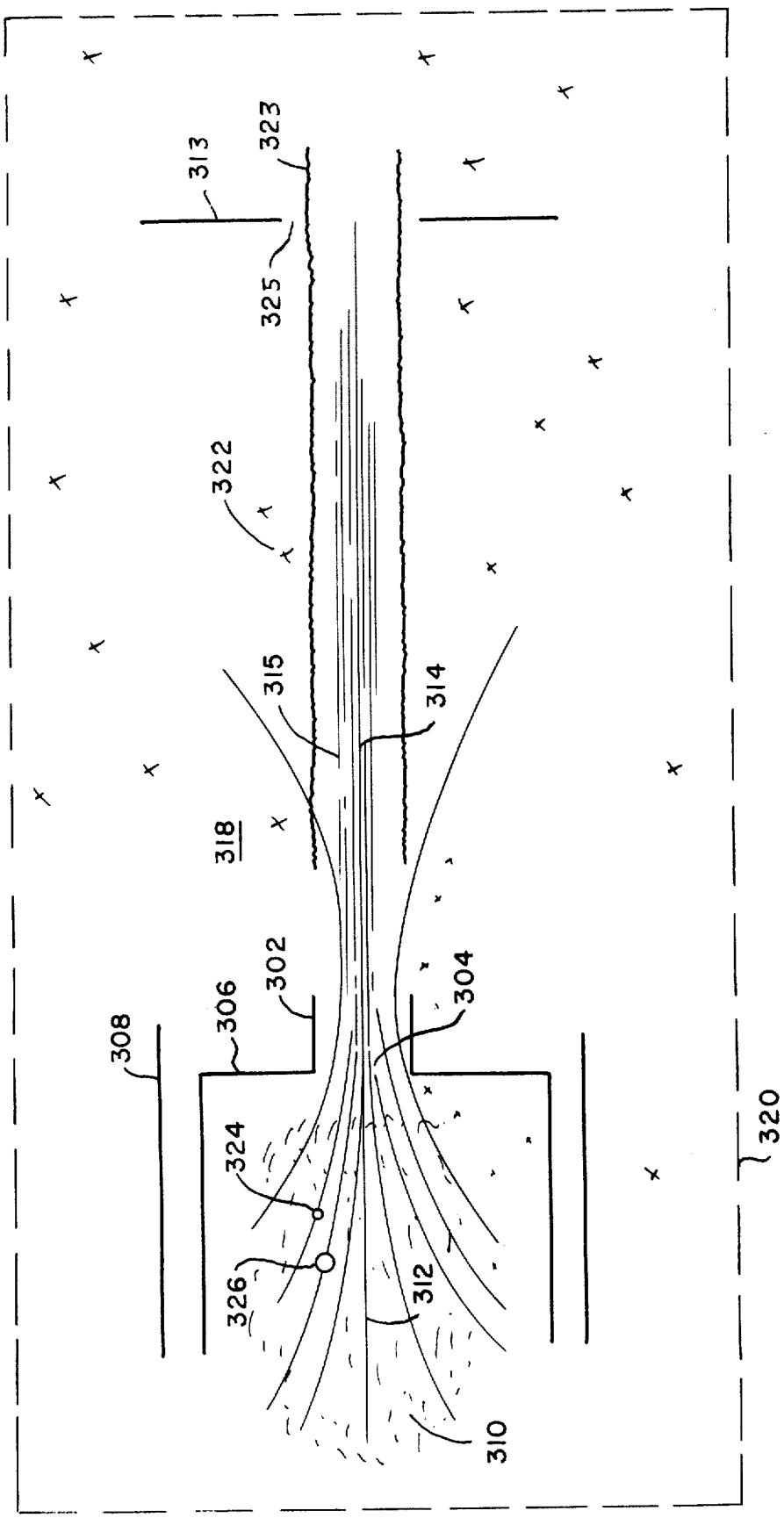
FIG. 6 illustrates the operation of the hollow cathode in more detail.

FIG. 6 shows in detail important portions of a feature of the present invention which include a hollow cathode, focusing structure, and other aspects, all especially useful in a gas-ion laser, as described in the following.

This is accomplished by a focusing electrode 302 shown in FIG. 6, electrically connected and attached and mounted outside an aperture 304 to a perforated hollow cathode structure 306, located within a laser enclosure 320 represented pictorially in dashed line.

The laser enclosure is filled with a lasing gas (i.e., a noble gas such as Helium) and a voltage difference is applied between the hollow cathode 306 (constructed of a perforated metal such as stainless steel mesh of 85% transparency) and an auxiliary electrode 308 located in the vicinity of cathode 306. This causes a plasma 310, containing electrons 324 and ions 326, to form within the hollow cathode structure 306. A portion of this plasma leaves the cathode along a beam axis 312 through the aperture 304, and is attached to and accelerated by accelerating anode 313. Accelerating anode 313 is generally aligned along the electron-laser beam axis 312, and has an opening 325 therein through which a laser beam 323 may pass.

Focusing electrode 302 acts to shape the electrostatic field (as represented by electric field lines 305) in such a way that it forms an electrostatic lens which focuses the electron plasma beam 314 as it leaves the hollow cathode and launches the electron-plasma beam 314 in a tight, highly directional manner. As soon as the electrons emerge from the electrostatic lens-focusing electrode 302, the space charge of the electron beam in general would cause the beam to become defocused. However, since the electrons 324 are emerging with an accelerated velocity into a region 318 where there are gas atoms 322, a considerable portion of the gas atoms in the path of the electron-plasma beam 314 will become ionized. The resulting space-charge field produced by these ions will tend to neutralize the high energy electron beam coming out and thus prevent the electronplasma beam 314 from diverging.

Since the electron-plasma beam can remain collimated in the vicinity of the extraction region (aperture 304- focusing electrode 302) of the electrostatic lens, the electron beam then propagates along the beam axis 312 in a collimated form in the direction of the accelerating anode 313. This collimated electronbeam ionizes gas atoms in its path, which in turn provide the necessary ions for further space-charge neutralization of the electron-plasma beam as the beam propagates. Thus the pressure of the gas 322 in the path of the electron-plasma beam 314 provides the ions necessary to keep the beam from defocusing, at the same time it provides the ions necessary to form the positively charged components of the plasma.

The composition of the electron-plasma beam 314 is essentially a plasma determined by the equilibrium between the volume ionization within the plasma and the loss of positive and negative charges to the boundary 315 of the plasma. In general the loss of charges proceeds through ambipolar diffusion (free diffusion) where the lower mass of the electrons gives them much larger random velocity than that of the positive ions. Therefore, the electrons tend to leave the plasma more readily than the ions; as a result the electron-plasma beam has a slight accumulation of positive charge—in some instances on the order of a fraction of a percent. As a result of this slight excess of positive charge in the electron-plasma beam, the center of the beam is slightly positively charged with respect to the exterior of the beam (the potential difference being on the order of 2 to 20 electron volts). The positive discharge tends to pull the electrons toward the center of the beam, thus providing a self-collimating mechanism.

In this way, the present invention provides for a method of extracting electrons from a hollow cathode structure in a sufficiently focused beam so that the resulting ions produced from collisions of electrons with the lasing gas are sufficiently concentrated in order to achieve propagation of the electron beam in a concentrated form.

The conventional ion-laser, when operating with an electrical power input of 8 to 15 amps at approximately 200 volts and an operating pressure of a few hundred microns Hg, has an average electron energy of about 4–5 ev. Since the ionization potentials and the upper laser levels of most gases used in ion-lasers are in general considerably larger than this average energy, ionization and excitation must rely on the minor group of electrons having high energy values.

In the case of hollow cathode discharges, because of high voltage operation and the associated large E/p value, the beam electrons are characterized by a displaced Maxwellian distribution with their directed velocity greater than their random velocities. Thus, for the hollow-cathode discharge ion-laser of the present invention, almost all electrons within the electron beam are energetically capable of causing ionization and excitation.

The average energy of the beam electrons can be estimated by following a method developed by von Engle and Steenbeach, ("electrische Gasentladungen, ihre Physils v. Technik" Vol. 2, Springer, Berlin 93 (1934)) for analysis of positive columns of glow and arc discharges. By this technique, when applied, for example, to an argon gas laser operated in a pressure range between approximately $10^{-3}$ and $10^{-2}$ Torr utilizing the perforated wall hollow cathode of the present invention, it may be seen that the average electron energy is very high; therefore a high degree of ionization can be achieved within the electron beam even with a relatively low current density.

The current density of the electron beam can conveniently be adjusted by changing the grid bias, the gas pressure, the cathode potential, the longitudinal magnetic field strength, or the size of the dominant cathode aperture.

Figure 2:
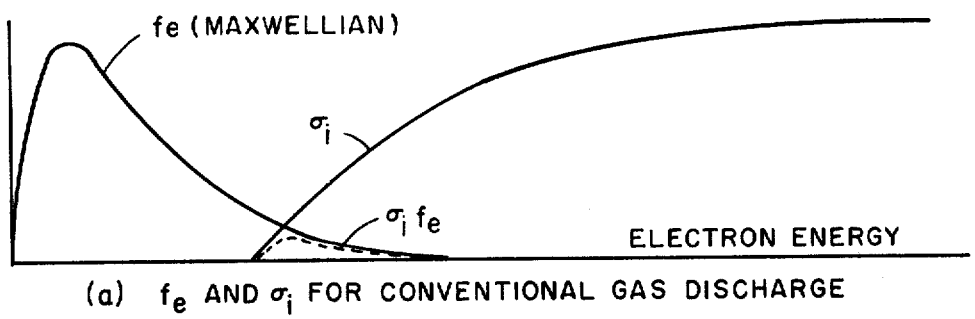
FIGS. 2a, b, c and d show a schematic representation of the electron distribution function, ionization cross section, and the product of the two for prior art devices (FIGS. 2a and b) and for the present invention (FIG. 2c and d).
Figure 2:
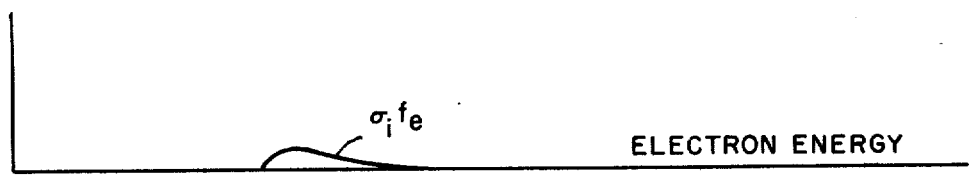
Figure 2:
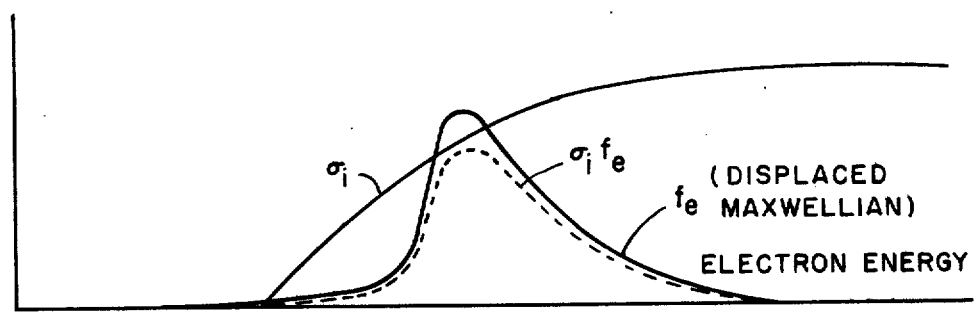
Figure 2:
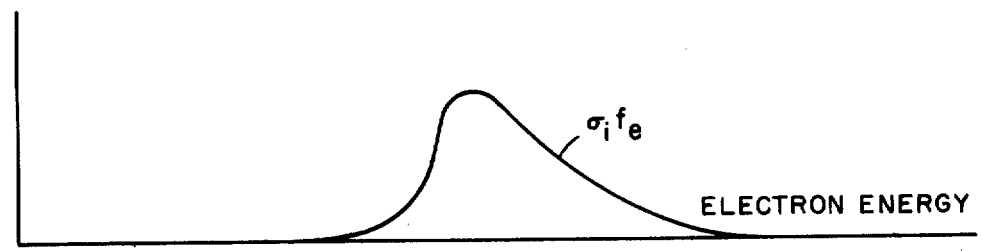

The average energy of beam electrons will be determined by balancing the rate of electron loss through ambipolar diffusion and the rate of electron production by volume ionization. The effect of electrons with a displaced Maxwellian distribution interacting in the process of ionization by electron impact with atoms is indicated in FIG. 2. The electron distribution function $f_e$, the ionization cross-section $\sigma_i$, and the product $\sigma_i f_e$ having a displaced Maxwellian distribution are schematically shown in FIG. 2a and b for the conventional discharge used by existing ion lasers, and in FIG. 2c and d for the hollow cathode discharge in accordance with the present invention for use in ion-lasers.

The derivation of these distribution curves is as follows:

The rate of ion production can be expressed as:

$$\frac{dn_+}{dt} = \frac{dn_e}{dt} = k_i n_e n_a$$

where $k_i$ is the ionization rate constant, and $n_+$, $n_e$, and $n_a$ are respectively the density of ions, electrons, and neutral (atoms) (number).

Because of the mass disparity between an electron and an atom, the relative speed (which is a factor governing all binary collision processes) can be approximated by the electron random speed. From this it follows that the microscopic rate constant for ionization is directly proportional to the electron random speed v and the ionization cross-section $\sigma_i(v^2)$. For electrons with a velocity distribution function $f_e(v, V_d, T_e)$ the average rate constant for ionization can be defined as follows:

$$k_i = v\sigma_i(v^2)$$

It should be noted that for conventional ion lasers, the electron drift velocity is usually small, so that ionization is accomplished by a small group of electrons at the high energy tail of the distribution function, whereas in the ion laser of the present invention, electrons have large drift energy and practically all electrons within the beam are able to participate in the ionization process.

The degree of ionization in the beam is high but because of the electron runaway process electrons are not scattered by collisions. In electron runaway the scattering cross section decreases fast enough with respect to electron velocity so that the electron finds it easier and easier to gain energy. The electrons will gain energy at an even increasing rate. This is because of the strong energy dependence of the Rutherford scattering law (which states that the electron-ion momentum transfer cross-section is inversely proportional to the square of the electron kinetic energy). The electron will gain energy at an ever increasing rate. Further, its drift velocity is not bounded by a terminal value, but it grows monotonically with time. The growth of electron energy is eventually inhibited by collisions with ionic cores. At high energies, incident electrons with impact paramters comparable to the ionic dimension can reach and penetrate the bound electronic structure of the ion.

Thus, the energetic beam electrons collide only with ionic cores to excite the ion, and with atoms to produce an excited ion. Population inversion and laser action will result when suitable gases, such as Ar, Xe, Kr, Ne, $Cl_2$, $Br_2$, S, P, Hg, etc., are introduced.

Radiation trapping (i.e.., radiation resulting from a transition from lower laser levels to the ion ground state) causes saturation of the laser output power-per-unit-area of the active discharge column; therefore the total output power of a continuous wave ion laser can be increased by merely making the diameter of the plasma column larger. But the size of the plasma column has no bearing on radiation trapping in the case of a continuous wave ion laser. It is important to note that the scheme for increasing the total laser output power by increasing the plasma diameter is not particularly helpful in the case of conventional prior art continuous wave lasers because of thermal and other limitations such as imposed for example by the quartz capillary previously described.

The situation for the hollow cathode ion-laser of the present invention is different. Output power of an ion-laser in accordance with the present invention appears unlimited, at least with respect to the above limitations. For higher laser outputs, larger cathodes with larger beam apertures can be used. Operation of a high power laser utilizing the present invention may, for example, be at beam currents ranging up to 2 amps for a 3 inch cathode operated at 20 K V with an argon gas (equivalent to an input power of 80 KW for the particular embodiment discussed above). The maximum power injected appears primarily limited only by the capacity of the power supply used.

The efficiency of a conventional continuous wave ion laser is generally less than 0.2%. By utilization of the present invention laser efficiency can be considerably higher due to the absence of appreciable wall losses and surface recombination, especially in relation to the high efficiency achieved by $CO_2$ lasers for which the surface-to-volume ratio of the discharge column, (and hence wall loses) are relatively small. Thus, for example, an ion-laser in accordance with the present invention using a 3 inch perforated wall hollow cathode operated at 20 K V with two electron beams each drawing a current of approximately 2 amps, an overall efficiency on the order of 1% to 2% is estimated with output power the order of 800 watts.

The gas ion laser of the present invention is also suitable for operation in a pulsed mode. With the device operating at relatively low beam power to keep the plasma alive, a high energy pulse can be applied to take advantage of a large momentary inversion during a short duration pulse (e.g., less than 10 microseconds) before radiation trapping and beam instability (i.e. divergence) occur.

Figure 3:
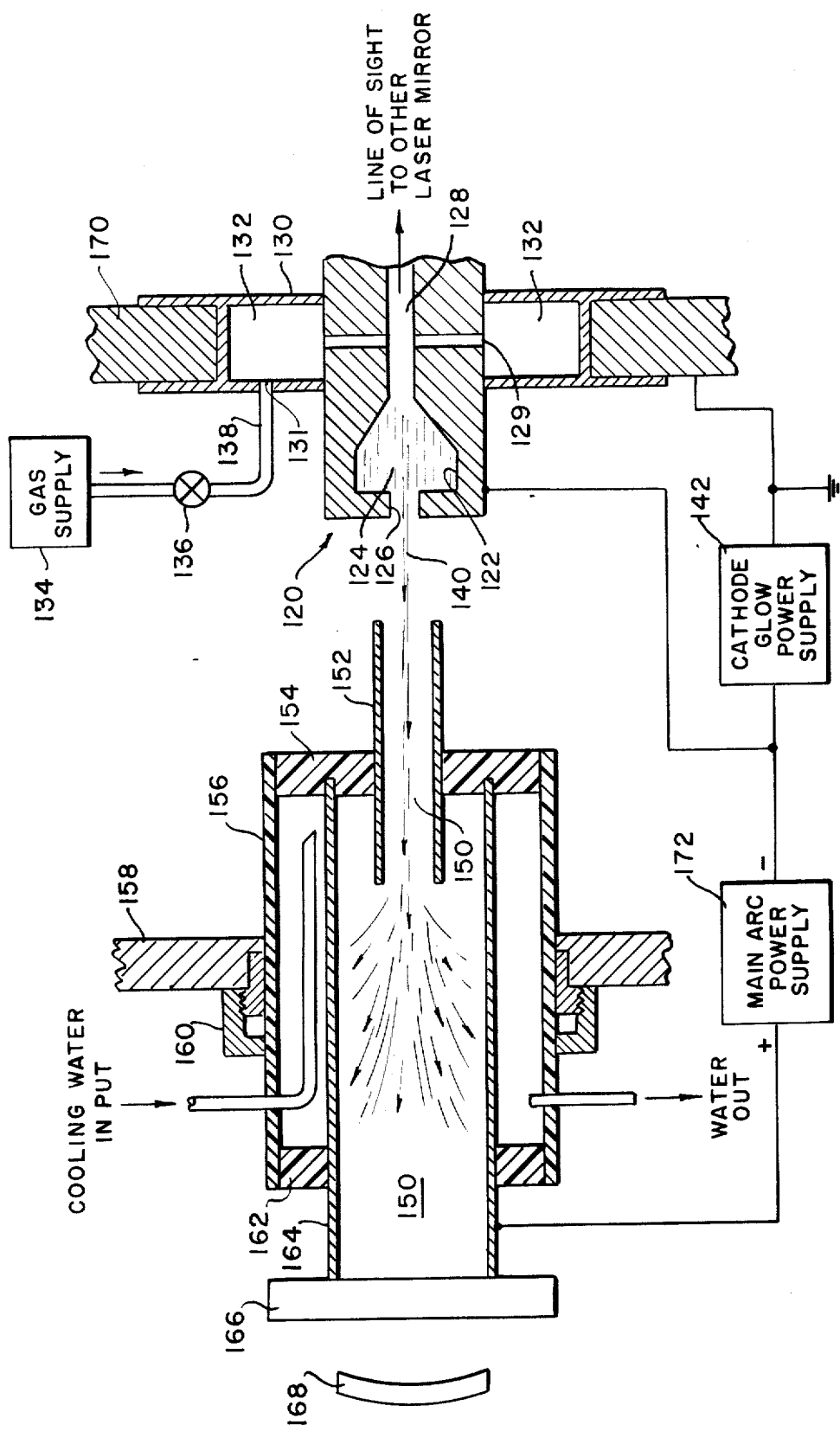
FIG. 3 shows in pictoral cross section another embodiment of the present invention utilizing the differential pressure feature of the present invention.

A feature of the present invention is the use of a differentially pumped cathode laser region, as illustrated in the embodiment shown pictorically in part in FIG. 3. In this embodiment, a differentially pumped hollow cathode structure 120 passes through and is held rigidly in place by insulating wall 130. The hollow cathode 120 has a cavity 122 in which a glow discharge 124 may be contained. Apertures 126 are present in the wall of cathode 120 forming passageways for an electron beam 140 to pass from the cavity 122. In the central portion of the cathode 120 is a tubular passageway 138 connecting either another cavity symmetric about the center of wall 170 or to a laser mirror 168. Communicating with tubular passageway 128 is another passageway 129 which forms a passageway from tubular passageway 128 to the interior portion 131 of insulating wall 130. The interior portion 131 of insulating wall 130 forms a chamber for receiving a gas 132 from a gas supply 134. Regulator 136 and tubing 138 provide the means whereby the laser gas in introduced and by which the pressure of gas 130 is maintained.

A cathode glow power supply 142 is connected with and provides an operating potential to cathode 120. Electron beam 140 is directed toward a discharge chamber 150 having a tubular structure 152 having its axis generally coincident with electron beam 140. The tubular structure 152 is held rididly in place by an annular shaped end wall 154 constructed of refractory insulating material. End wall 154 is fitted and attached within the end of a cylindrical water jacket 156, constructed from any suitable material such as plastic. A vacuum flange 158 is attached around water jacket 156 by a Goddard fitting 160.

Passing through and attached to another annular end wall 162 located at the end of jacket 156 and opposite end wall 154 is a cylindrical electrode 164 constructed out of a suitable conductive material such as aluminum. One end of electrode 164 is embedded into and attached to end wall 154 while a laser window 166 such as a Brewster angle window is attached at the other end of electrode 164. A Brewster laser mirror 168 is placed outside of electrode 164 and laser window 166 in line with the optical discharge path of the discharge chamber and generally coincident with the axis of the electron beam 140 path.

The insulator wall 130 is attached to a suitable metal wall 170, for example aluminum, which is connected to vacuum flange 158 thereby forming an easled enclosure for the hollow cathode 120-glass tube 152 region. In this embodiment of the present invention, the differential pressure feature may be seen to operate as follows: A difference in pressure is maintained between the cathode cavity 122 and the laser plasma region 150. The cavity 122 of cathode 120 is operated at a pressure higher than that of the laser plasma column 150. Alternatively, the gas feed line 138 may be connected to an exhaust pump, in which event the hollow cathode 120 can then be maintained at a lower pressure than the laser plasma column 150. This may be accomplished by means of the differential pumping at the aperture 126, thereby isolating the hollow cathode 120 and the laser plasma region 150. In this embodiment the anode 164 is water cooled by pumping water around electrode 164 inside water jacket 156. A catophoresis mode of differential pumping may be utilized to implement this feature of the present invention.

Another feature of the present invention is the use of an auxiliary electrode used to maintain a virtual plasma cathode. An embodiment of this feature is illustrated in FIG. 4.

Figure 4:
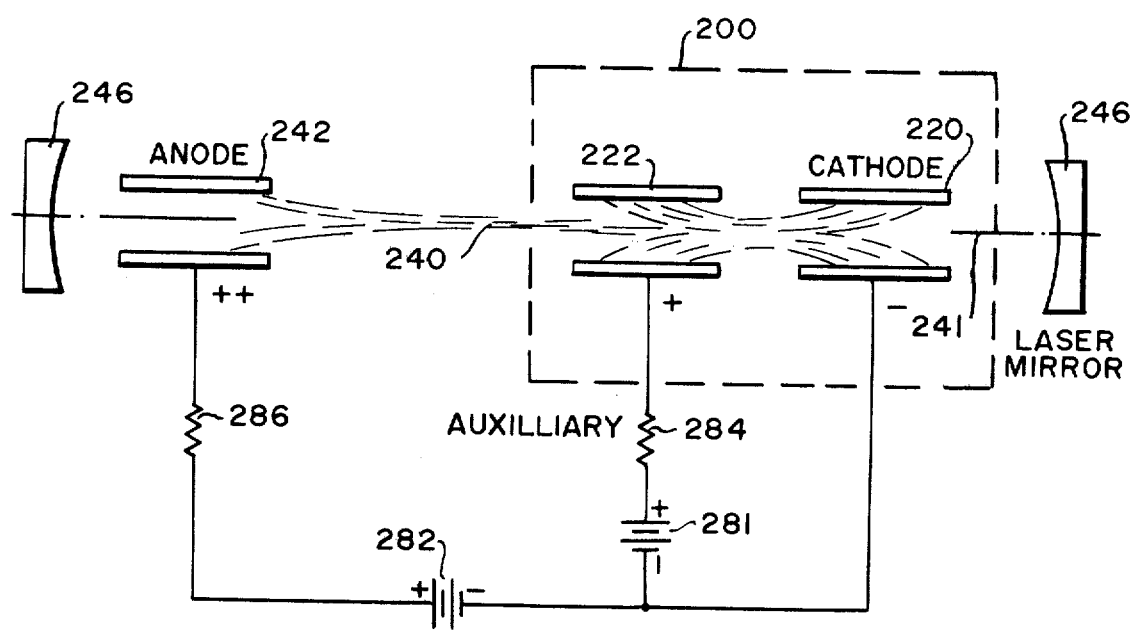
FIG. 4 shows in pictorial cross section the keep-alive Auxiliary Electrode feature of the present invention.

A cathode structure 200 is indicated in phantom in FIG. 4. This structure is comprised of a main cathode structure 220 and an auxiliary electrode structure 222 disposed in close relationship to the main cathode structure 220. The cathode structure is arranged so as to allow an electron beam 240 to emanate therefrom along an axis 241 in the direction of an anode 242.

A source of operating potential 281 is connected through current limiting resistor 284 so that its positive terminal is connected to the auxiliary electrode 222 and its negative terminal is connected to the main cathode 220. Another source of operating potential 282 is connected with its negative terminal connected to the main cathode 220 and its positive terminal connected through current limiting resistor 286 to anode 242.

The axis 241 is coincident with the laser discharge axis along which a laser beam output occurs and along which the usual laser components, such as laser mirrors 246 are arranged.

Operation of this feature is as follows:

By use of the auxiliary cathode, the plasma cathode may be maintained independently of the main discharge so that the potential applied to the main anode can be optimized for production of a stable plasma and electron source, while at the same time optimizing the main power supply potential to maximize laser output power and efficiency.

In addition, the auxiliary cathode may also be differentially pumped to maintain the pressure in the plasma cathode region at values best suited to maintain the plasma, and the pressure in the plasma laser region maintained at pressures best for laser operation.

A feature of this invention is utilization of secondary or collecting electrode utilized to collect the electron beam in a gasion laser.

Figure 5B:
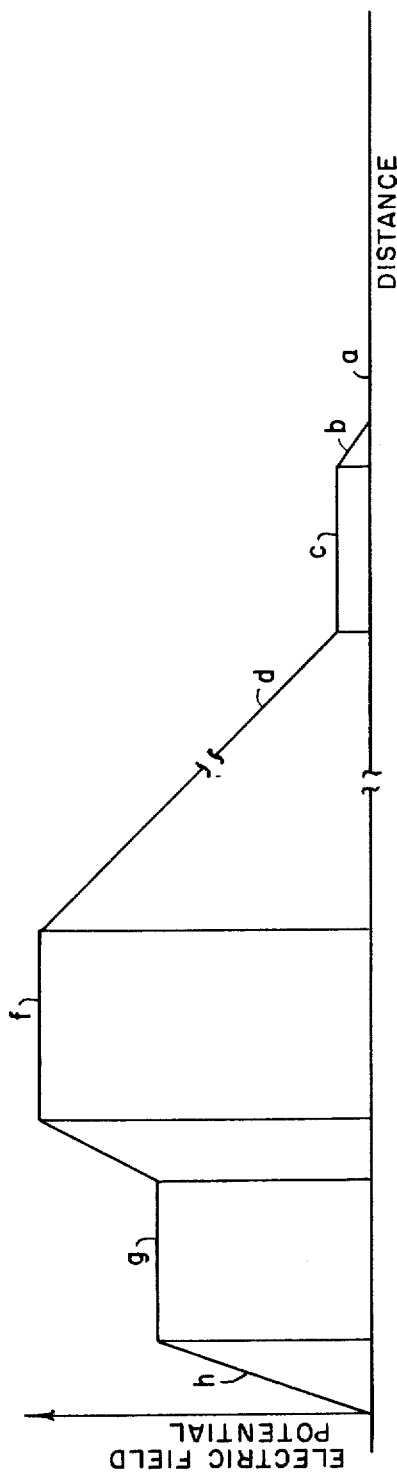
Figure 5A:
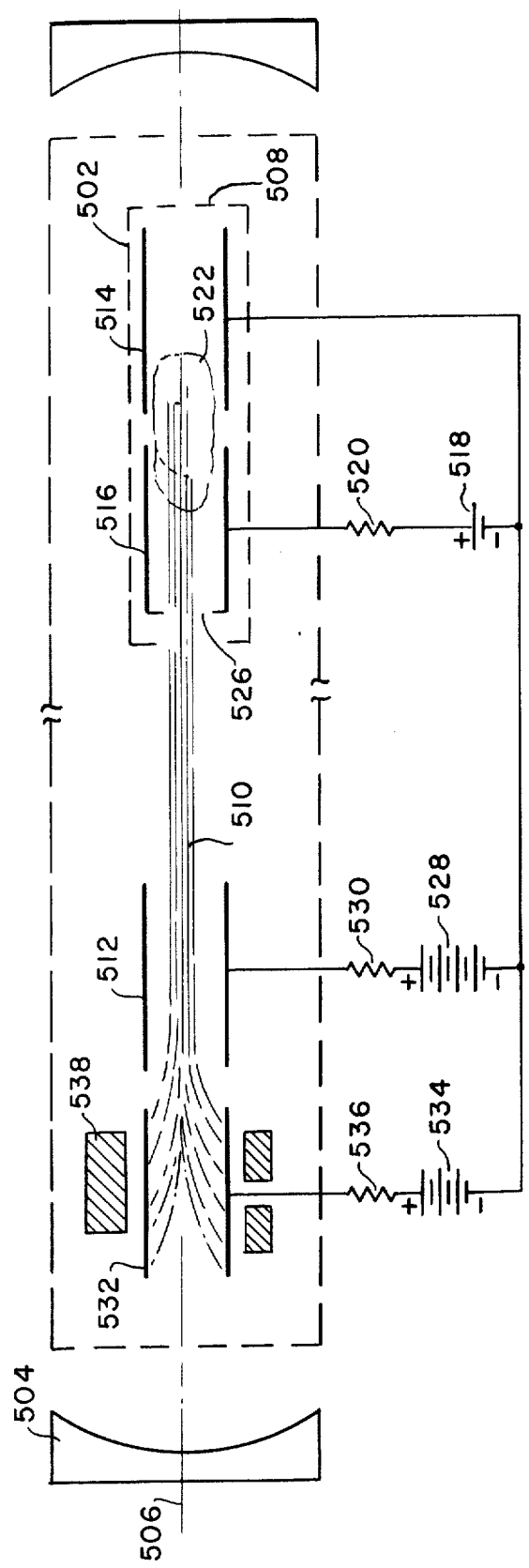
FIG. 5a shows the use of a collecting electrode in a gas laser system.

An embodiment of this feature is illustrated in FIG. 5a. A gas laser enclosure 502 indicated generally by the dashed line has laser mirrors 504 at either end along the laser axis 506. The enclosure is filled with a lasing gas, such as Helium, Neon, Argon, Kripton, Xenon, etc. An electron beam generating structure 508 indicated in phantom comprises a structure from which when properly operated emanates an electron beam 510 along an electron beam laser axis 506.

Although this electron beam structure may be of any type desired for a specific purpose, a particular structure is shown in the embodiment illustrated in FIG. 4. The embodiment illustrates another feature of the present invention. The structure is made up of a cathode electrode 220 and a keep-alive auxiliary electrode 222.

The keep-alive auxiliary electrode 222 acts to maintain the plasma—like a pilot light. This makes it possible to maintain the plasma without regard to the voltage of any other electrode such as that of accelerating electrode 242. In this way modulation of accelerating electrode becomes possible (and thus modulation of the laser beam) without regard to the voltage on the other electrodes required in prior art devices to maintain the plasma. When an appropriate potential (e.g. 400 volts) is maintained between them (such as by a potential source 281 acting through a current limiting resistor 284), an electron-plasma region is formed between cathode 220 and the keep-alive electrode 222.

It may be seen in FIG. 5a that a portion of the plasma may then be allowed to emanate through an opening to the cathode structure 200. When a potential 528, positive with respect to the electron beam generating structure 526 (e.g., more positive than the potential of auxiliary electrode 516) is supplied through current limiting resistor 530. To accelerate electrode 512 generally symmetrical around about the beam axis 506, the electron-plasma beam 570 is accelerated to auxiliary electrode 512. This electrode is so arranged that the electron beam is not collected by it. For this purpose a secondary, or collecting anode 532 is arranged generally symmetrically about the electron beam axis 506. A potential 534 is applied to this electrode through current limiting resistor 536. It is important that the potential applied to the secondary or collecting anode 532 be of a value that is less positive than the potential applied to the accelerating anode 512 but more positive than the electron-beam generating structure 526. A deflection device may optionally be utilized to deflect the electron beam away from the path 506 and towards the surface of the secondary anode element 532. This deflection device may take the form, for example, of an electric coil 538 surrounding the secondary anode 532, and be connected to a source of operating potential (not shown), and operated so as to produce a magnetic field which causes a desired electron deflection path.

FIG. 5b indicates the magnitude of the electric field along the electron beam axis of the embodiment of FIG. 5a.

Thus the present invention provides an improved gas-ion laser having a cold hollow cathode structure and utilizes such features as a plasma keep-alive electrode to maintain the plasma, depressed operation of a collecting electrode to reduce power required for operation, and various means to assist in containing the electron-plasma beam which include a magnetic field, an alternative field gradient, and Einzel lens arrangements. Differential pumping of the hollow cathode region with respect to the discharge region is also an important feature, as is accomplishing this by catophoresis techniques.

The present invention minimizes the problem of thermal dissipation and ion bombardment leading to degradation and early failure of prior gas-ion laser devices. The present invention also minimizes the high rates of energy loss and ion recombination on the capillary wall resulting from prior art direct physical contact between the active discharge column and the quartz tubing which in the present invention avoids higher output power and higher efficiency obtained by the present invention are important advantages achieved by the laser of the inventions. Obviously, many modifications and variations of the present invention are possible in light of the above teachings. It is therefore to be understood that within the scope of the appended claims the invention may be practised otherwise than as specifically described.

What is claimed is:

1. A gas laser comprising:
    elongated laser enclosure means having a lasing axis running lengthwise through said enclosure, said laser enclosure being filled with a suitable gas for lasing at a predetermined pressure;
    hollow cathode means with perforated walls located within said laser enclosure means, said cathode means having at least two apertures axially aligned along said lasing axis;
    auxiliary anode means positioned near said cathode means and arranged so as not to obstruct said cathode apertures;
    said cathode means and said auxiliary anode means each being adapted to receive a voltage potential, the potential difference between the voltages applied to said cathode means and auxiliary anode means being sufficiently high so that a plasma of electrons and ions is situated within the interior of said hollow cathode means;
    accelerating anode means positioned within said laser enclosure means axially along said lasing axis and energized with a sufficient voltage potential relative to said auxiliary anode means so that a collimated beam of high energy electrons and ions is drawn from one of said apertures in said cathode means, the high energy electrons of said beam causing a population inversion sufficient to form a laser beam along said lasing axis, said accelerating anode means having a central opening to permit the passage therethrough of both the laser beam and said beam of electrons and ions; and
    feedback-output means positioned along said lasing axis for reflecting a portion of said laser beam back along said laser axis, and for allowing the remaining portion of said laser beam to be emitted from said gas laser.

2. A laser apparatus as defined by claim 1 wherein said enclosure means is divided into a cathode chamber enclosing a hollow cathode structure with at least one hollow cavity therein, and at least one laser discharge chamber, and means for maintaining a pressure difference between said cavity and said discharge chamber.

3. A laser apparatus in accordance with claim 2 wherein said pressure difference is maintained by catophoresis differential pumping.

4. A laser apparatus in accordance with claim 1 wherein said gas is any noble gas.

5. A gas laser as defined in claim 1, wherein said cathode means has a focusing electrode means attached to and surrounding the apertures of said cathode means and extending outward therefrom along said lasing axis, said focusing electrode means being electrically connected to said cathode means.

6. A gas laser as defined in claim 1, wherein said enclosure means further comprises means for introducing a flow of said suitable gas at a predetermined pressure through the interior of said enclosure means.

7. A gas laser as defined in claim 1, further comprising:
means for generating a magnetic field along said lasing axis in order to further confine said electron-ion beam.

8. A gas laser as defined in claim 7, wherein said means for generating a magnetic field comprises:
a plurality of electric coils spaced along said lasing axis about said electron-ion beam; and
means for supplying an operating current to said electric coils.

9. A gas laser as defined in claim 7, wherein said means for generating a magnetic field comprises:
means for generating an alternating gradient magnetic field along said lasing axis.

10. A gas laser as defined in claim 1, comprising:
Einzel lens means positioned about said lasing axis for further collimating said electron-ion beam.

11. A gas laser as defined in claim 1, further comprising:
secondary anode means aligned along said lasing axis and positioned on the opposite end of said accelerating anode means from said cathode means for collecting the electrons from said electron-ion beam passing through the central opening of said accelerating anode means.

12. A gas laser as defined in claim 11, wherein said secondary anode means has a central opening for passing a laser beam therethrough and electric coil means surrounding said secondary anode means for deflecting the electrons away from the lasing axis.

13. An electrode structure for use in a gas-ion laser apparatus including a laser enclosure and means for introducing a gas flow at a predetermined pressure through the interior of said enclosure comprising:
hollow cathode means, focusing electrode means, and auxiliary anode means positioned within said enclosure:
said cathode means being in the shape of a hollow structure having at least one aperture, said cathode means being constructed from a material that is highly porous to electron-ion plasma;
said focusing electrode means attached to said cathode means, surrounding the aperture of said cathode means and extending outward therefrom for focusing an electronion beam emanating therefrom;
said auxiliary anode means located in the general vicinity of said cathode means; and
connection means for supplying operating potential to said cathode means and to said auxiliary anode means.

14. The electrode structure of claim 13 wherein said hollow cathode is substantially symmetric about an axis and has a cross section perpendicular to said axis described by a conic section.

15. The electrode structure of claim 14 wherein said conic section is a circle.

16. The laser apparatus of claim 14 wherein said conic section is an ellipse.

17. The electron structure of claim 13 wherein said cathode is in the form of a hollow sphere.

18. The electrode structure of claim 13 wherein said cathode is in the form of a hollow rectangular volume.

19. The electrode structure of claim 13 wherein said cathode has a transparency in the range of 60 to 99 percent.

20. The electrode structure of claim 13 wherein said cathode is constructed from stainless steel mesh.

21. A method of generating a laser beam in a gas-ion laser apparatus including a laser enclosure with a laser axis running therethrough;
a hollow cathode structure within said enclosure having at least one aperture substantially aligned along said laser axis of said enclosure;
an auxiliary anode structure located in the general vicinity of said cathode structure and having at least one anode aperture, said anode aperture being larger than and substantially aligned with said cathode aperture;
an accelerating anode located along said laser axis facing said cathode aperture, said accelerating anode having an aperture through which said laser beam may pass; and
optical feedback means substantially aligned along said laser axis, said method comprising the steps of:
introducing a lasing gas flow at a particular pressure into said enclosure;
generating a high energy electron beam having a velocity distribution that is high enough so that most of the electrons in said electron beam are capable of causing lasing gas ionization and excitation by applying a highly negative voltage to said cathode structure and a positive voltage to said auxiliary anode structure, and maintaining an electric field between said cathode and said accelerating anode by applying a positive potential between said accelerating anode and said cathode so that said electron beam emanates from said cathode aperture;
ionizing and exciting to an upper energy state said gas by collisions with the electrons of said plasma beam; and
maintaining a laser beam by optical feedback from said optical feedback means.

22. An improved gas laser device having a laser enclosure;
means for introducing a flow of noble gas at a predetermined pressure;
means for generating a high energy electron beam capable of causing a population inversion in said noble gas sufficient to generate a laser beam;
an accelerating electrode structure aligned with said electron beam generating means for drawing out and for accelerating said electron beam, said electrode structure having connections for supplying to said accelerating electrode structure a positive potential;
a secondary anode electrode structure aligned with said electron-beam generating means for collecting said electrons of said electron beam; and
connections for supplying to said anode structure a positive potential whose value is less positive than potential applied to said accelerating electrode.

23. A method for accelerating and collecting an electron beam in a laser device having a laser enclosure with a laser axis running therethrough, an accelerating electrode positioned along said laser axis, and a secondary anode for collecting the electrons from said electron beam, said method comprising the steps of:
introducing a gas suitable for lasing into said laser enclosure at a predetermined pressure;
generating an electron-ion plasma from said gas in said enclosure;

applying a positive potential to said accelerating electrode for drawing out and accelerating an electron beam from said plasma along said laser axis; and applying a lower positive potential to said secondary anode, said lower potential being less positive than said potential applied to said accelerating electrode.

24. An electron-plasma beam focusing device for focusing an electron plasma beam along a beam axis within a gas filled enclosure comprising:

a cold mesh-type hollow cathode structure having a pair of opposed openings aligned with said beam axis therein which are larger than the aperture in said mesh and are suitable for passing an electron-plasma beam therethrough;

a focusing electrode electrically connected and attached to said cathode and arranged generally symmetric about said beam axis;

an auxiliary anode located generally near said cathode;

connections to said auxiliary anode and cathode for supplying a potential to said auxiliary anode which is positive with respect to said cathode;

an accelerating anode located on said beam axis having an opening therein through which a laser beam may pass; and connections for supplying a potential to said accelerating anode which is positive with respect to said auxiliary anode.

* * * * *